US008452452B2

(12) United States Patent
Kondo et al.

(10) Patent No.: US 8,452,452 B2
(45) Date of Patent: May 28, 2013

(54) GRIP POSITION CALCULATOR AND METHOD OF CALCULATING GRIP POSITION

(75) Inventors: Toshiyuki Kondo, Tochigi-ken (JP); Shinji Sawada, Tochigi-ken (JP); Nobuhiro Nanba, Utsunomiya (JP); Yoshikazu Hayakawa, Nagoya (JP); Kenji Fujimoto, Nagoya (JP); Akira Nakashima, Nagoya (JP); Takashi Uno, Obu (JP)

(73) Assignees: Honda Motor Co., Ltd., Tokyo (JP); National University Corporation, Nagoya-Shi (JP)

( * ) Notice: Subject to any disclaimer, the term of this patent is extended or adjusted under 35 U.S.C. 154(b) by 144 days.

(21) Appl. No.: 13/148,183

(22) PCT Filed: Jan. 28, 2010

(86) PCT No.: PCT/JP2010/051079
§ 371 (c)(1),
(2), (4) Date: Aug. 5, 2011

(87) PCT Pub. No.: WO2010/090117
PCT Pub. Date: Aug. 12, 2010

(65) Prior Publication Data
US 2011/0288683 A1    Nov. 24, 2011

(30) Foreign Application Priority Data

Feb. 9, 2009   (JP) .................................. 2009-027596

(51) Int. Cl.
*G05B 15/00* (2006.01)
*G06F 19/00* (2006.01)

(52) U.S. Cl.
USPC ........... 700/260; 700/245; 700/248; 700/246; 700/250

(58) Field of Classification Search
None
See application file for complete search history.

(56) References Cited

U.S. PATENT DOCUMENTS

2008/0023974 A1*   1/2008   Park et al. ................... 294/106
2008/0114491 A1*   5/2008   Takahashi ................... 700/245

FOREIGN PATENT DOCUMENTS

JP   2006-026875   2/2006

* cited by examiner

*Primary Examiner* — Ian Jen
(74) *Attorney, Agent, or Firm* — Rankin, Hill & Clark LLP

(57) ABSTRACT

The grip position calculator determines a grip position where the fingers can grip a workpiece in any orientation of the workpiece. The calculator then determines an initial position where the finger tips can grip the workpiece and set the initial position as a point of calculation. Then an allowable gripping force is calculated which is an index that indicates an allowable force to be applied to the workpiece at point. Then other allowable forces are calculated for a plurality of points near the point of calculation. Then the point of calculation is selected as a possible gripping position if the allowable force a point is greater than any of the allowable forces. Otherwise, one of the points is selected for another point of calculation where the greatest allowable force (De) has been calculated and return to calculating an allowable gripping force.

6 Claims, 15 Drawing Sheets

GRIP POSITION CALCULATOR AND METHOD OF CALCULATING GRIP POSITION

TECHNICAL FIELD

The present invention relates to a gripping position calculating apparatus (grip position calculator) and a gripping position calculating method (method of calculating grip position), for identifying a position where a multijoint manipulator movable by a moving means grips a workpiece according to an offline processing sequence of a computer.

BACKGROUND ART

Efforts have been made to automatize routines in an automobile manufacturing process with manipulators. For example, various processes such as welding processes, coating processes, and other processes have been automatized by a teaching playback process which reproduces actions that have been taught in advance.

If not only simple teaching playback processes, but also different actions depending on workpieces, are made possible, then the manipulators become applicable to a wider range of applications. For example, it is preferable for a manipulator to be able to grip workpieces of different shapes or workpieces disposed in different directions.

For gripping workpieces of different shapes with a manipulator, Japanese Laid-Open Patent Publication No. 2006-026875 discloses a means for calculating a condition for maximizing points of contact with a workpiece as an optimum gripping condition.

SUMMARY OF INVENTION

According to Japanese Laid-Open Patent Publication No. 2006-026875, it is disclosed that a control process is carried out to maximize points of contact with a workpiece. However, it fails to make a quantitative evaluation of such a condition as an optimum gripping condition.

The present invention has been made in view of the above problems. It is an object of the present invention to provide a gripping position calculating apparatus and a gripping position calculating method for determining a position where a manipulator can grip a workpiece more stably.

According to the present invention, there is provide a gripping position calculating apparatus for identifying a position where a multijoint manipulator movable by a moving member grips a workpiece according to an offline processing sequence of a computer, comprising an allowable external force calculator for calculating an allowable external force as an index indicative of magnitude of an external force which is allowed, with respect to a given gripping condition, and a selector for selecting a gripping condition for a greatest calculated allowable external force in a case where the allowable external force calculator determines allowable external forces with respect to a plurality of gripping conditions.

Since a gripping position is determined based on the allowable external force as an index indicative of the magnitude of an external force which is allowed, the manipulator can grip the workpiece more stably.

The allowable external force may be determined with respect to a smallest one of a plurality of distances from a cone boundary side of a frictional force with respect to a position where a distal end of the manipulator grips the workpiece under the gripping condition, and from critical boundary sides of a gripping force which can be generated by the distal end of the manipulator. According to a judgment based on the cone boundary side of the frictional force and the critical boundary sides of the gripping force that can be generated by the distal end of the manipulator, an appropriate allowable external force can be determined for gripping the workpiece much more stably.

According to the present invention, there is also provided a gripping position calculating method for identifying a position where a multijoint manipulator movable by a moving member grips a workpiece according to an offline processing sequence of a computer, the method comprising a first step of determining a position of the moving member where the manipulator can grip the workpiece at either one of attitudes, a second step of identifying an initial value of a gripping position where a distal end of the manipulator grips the workpiece with respect to the position of the moving member determined in the first step, and regarding the identified initial value as a to-be-calculated position, a third step of calculating and storing an allowable external force as an index indicative of magnitude of an external force which is allowed if the distal end of the manipulator grips the workpiece at the to-be-calculated position at the time, a fourth step of calculating and storing allowable external forces if the distal end of the manipulator grips the workpiece at a plurality of nearby positions around the to-be-calculated position, and after the third step and the fourth step, a fifth step of identifying the to-be-calculated position as a gripping candidate position if the allowable external force at the to-be-calculated position is equal to or greater than the allowable external forces at all the nearby positions around the to-be-calculated position, and updating one of the nearby positions where the allowable external force is maximum into the to-be-calculated position if the allowable external force at the to-be-calculated position is smaller than the allowable external force at any one of the nearby positions around the to-be-calculated position, and making a judgment to return to the fourth step.

Since a gripping position is determined based on the allowable external force as an index indicative of the magnitude of an external force which is allowed, the manipulator can grip the workpiece more stably. A more appropriate gripping position can be determined by repeating the fourth step and the fifth step.

The allowable external force may be determined with respect to a smallest one of a plurality of distances from a cone boundary side of a frictional force with respect to a position where a distal end of the manipulator grips the workpiece under the gripping condition and from critical boundary sides of a gripping force which can be generated by the distal end of the manipulator.

A plurality of initial values may be established in the second step, and the third through fifth steps may be carried out based on each of the initial values. One of a plurality of gripping candidate positions where the allowable external force is maximum may be further selected. It is thus possible to hold the workpiece more stably.

With the gripping position calculating apparatus and the gripping position calculating method according to the present invention, inasmuch as a gripping position is determined based on the allowable external force as an index indicative of the magnitude of an external force which is allowed, the manipulator can grip the workpiece stably against external forces.

DESCRIPTION OF EMBODIMENTS

A gripping position calculating apparatus and a gripping position calculating method according to an embodiment of the present invention will be described below with reference to FIGS. 1 through 15 of the accompanying drawings.

Figure 1:
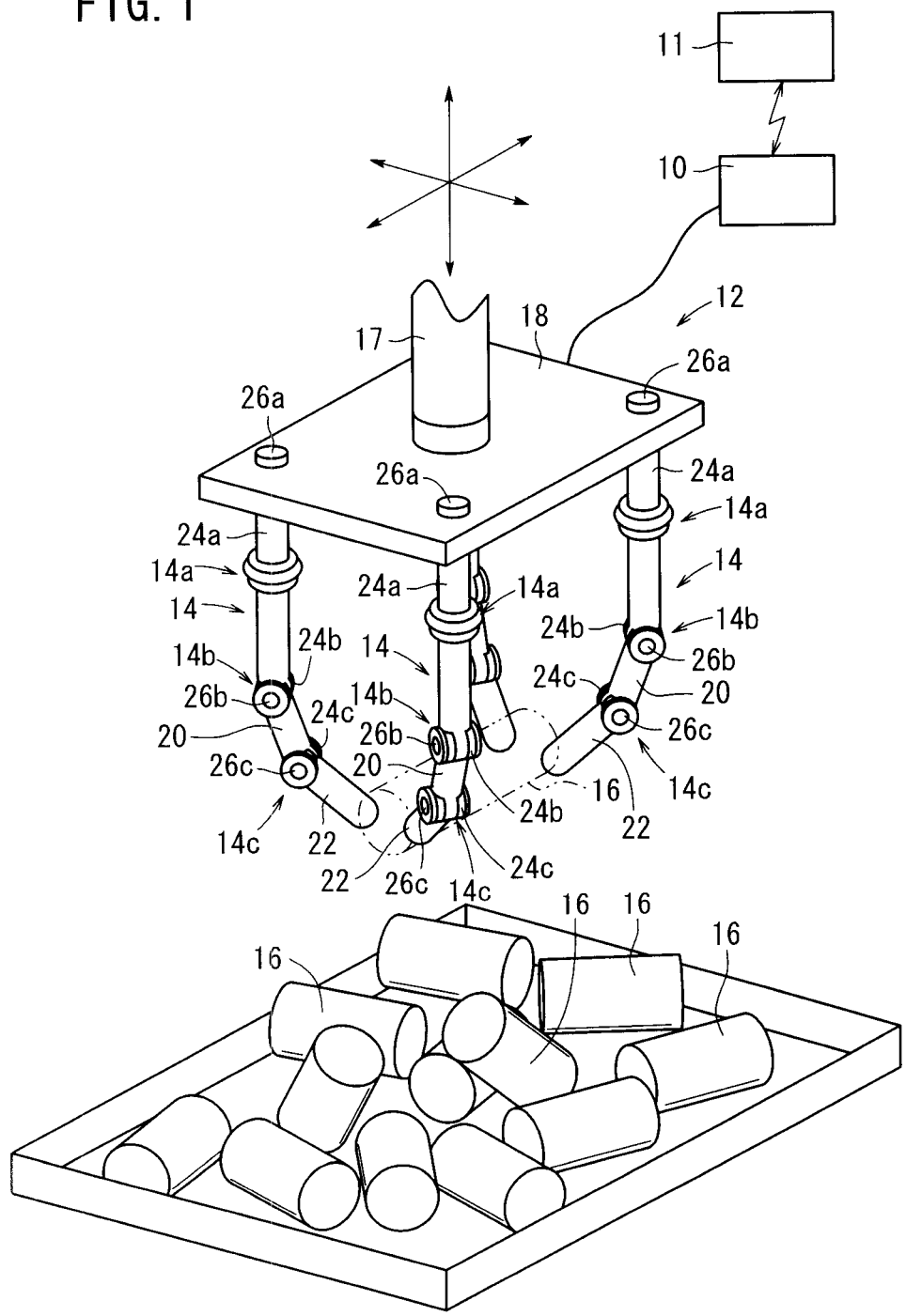
FIG. 1 is a schematic view of an apparatus for gripping an object, which incorporates a gripping position calculating apparatus according to an embodiment of the present invention.

A computer 11 as a gripping position calculating apparatus according to the present embodiment sets, in advance, the attitudes of fingers 14 of a gripping apparatus 12 that is controlled by a control apparatus 10 shown in FIG. 1, according to an offline processing sequence. The gripping position calculating method according to the present embodiment is a calculating method that is carried out by the computer 11. The computer 11 comprises a personal computer, a workstation, or the like. First, the control apparatus 10, the gripping apparatus 12, and the fingers 14 will be described below.

As shown in FIG. 1, the control apparatus 10 is an apparatus for controlling four fingers (manipulators) 14 of the gripping apparatus 12. The gripping apparatus 12 grips and carries workpieces 16 stored on a pallet with the four fingers 14. The gripping apparatus 12 is mounted on the distal end of a multijoint robot (moving member) 17, and is capable of stably carrying bulk workpieces 16 (which are random in position and orientation) in cooperation with the multijoint robot 17. In FIG. 1, the workpieces 16 are shown as being simply cylindrical in shape. However, the workpieces 16 are not limited to any specific shapes, sizes, and orientations.

The control apparatus 10 controls the gripping apparatus 12 using part of the data that have been generated by the computer 11, which is external to the control apparatus 10, according to an offline teaching process.

The gripping apparatus 12 includes a base plate 18 and the fingers 14 which are mounted respectively on the four corners of a lower surface of the base plate 18.

The fingers 14 project downwardly from the lower surface of the base plate 18. Each of the fingers 14 includes a first axis 14a about which the proximal end thereof can be swiveled parallel to the base plate 18, a second axis 14b perpendicular to the first axis 14a and about which a first arm 20 is rotatable so as to be bent with respect to the first axis 14a, and a third axis 14c parallel to the second axis 14b and about which a second arm 22 is rotatable so as to be bent with respect to the first arm 20. Each of the fingers 14 also includes a motor 24a, a motor 24b, and a motor 24c as drive motors for the first axis 14a, the second axis 14b, and the third axis 14c (hereinafter simply also referred to as "joints"), and an angle sensor 26a, an angle sensor 26b, and an angle sensor 26c for detecting the angles of the first axis 14a, the second axis 14b, and the third axis 14c.

Each of the fingers 14 is thus of a multijoint structure having three axes. The second arm 22 has a distal end for abutment against a workpiece 16. The four fingers 14 are identical in structure, and are disposed symmetrically about the center of the base plate 18. Each of the fingers 14 is devoid of any other sensors (force sensors, torque sensors, or the like) than the angle sensors 26a through 26c, and hence is of a simple structure. The motors 24a through 24c and the angle sensors 26a through 26c do not need to be directly mounted on the joints, but may be connected thereto through given rotation transmitting members. The motors 24a through 24c may be combined with speed reducers. The motors 24a through 24c should preferably comprise servomotors.

The control apparatus 10 includes controllers associated with the respective fingers 14, and is partly or wholly software-implemented by the computer. The control apparatus 10 is connected to a workpiece recognition apparatus, not shown. The workpiece recognition apparatus recognizes each individual workpiece 16 with an optical means or the like, and supplies information representative of the position and the orientation of each individual workpiece 16 to the control apparatus 10. Based on the information obtained from the workpiece recognition apparatus, the control apparatus 10 can switch between a position control mode and a force control mode for appropriately gripping the workpiece 16 depending on the situation.

The control apparatus 10 selects a suitable one of a plurality of teaching data obtained in advance from the computer 11, depending on the state of a workpiece 16, and can control the fingers 14 in the position control mode.

The computer 11 and an offline processing sequence performed by the computer 11 will be described below.

Figure 2:
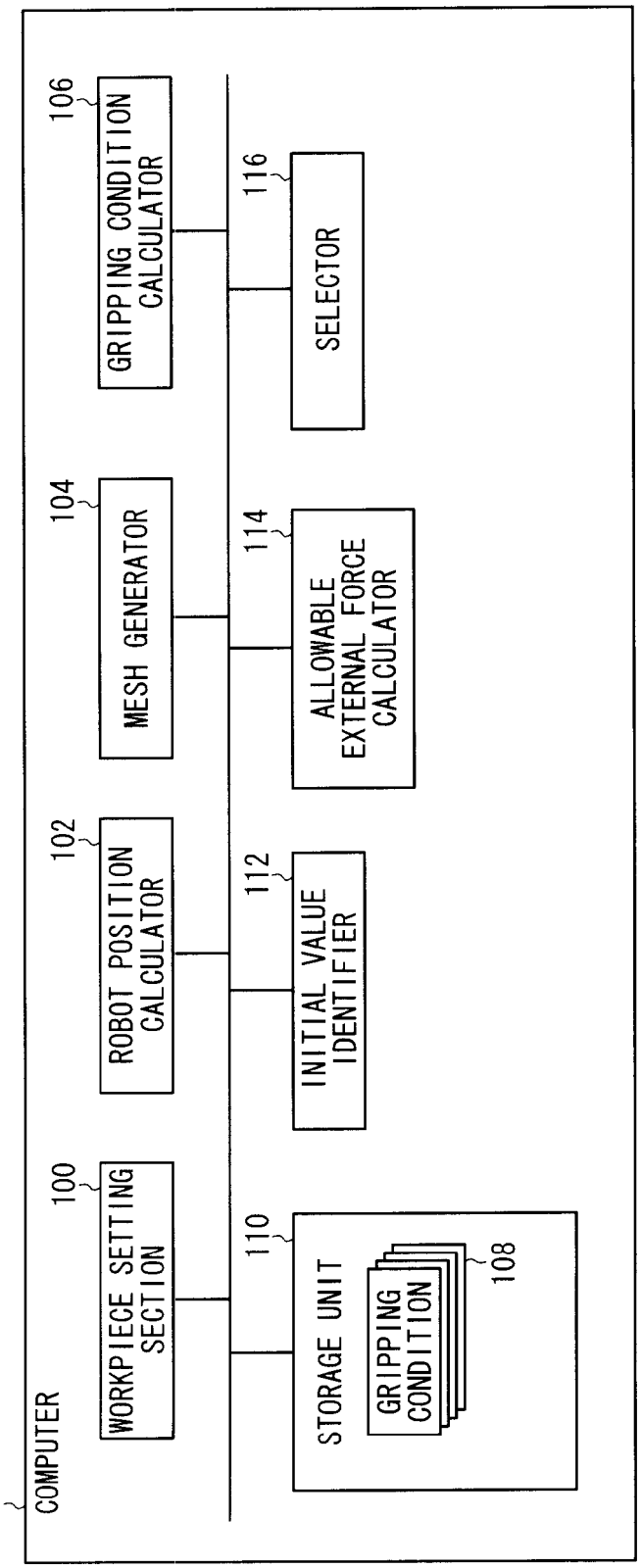
FIG. 2 is a block diagram of the gripping position calculating apparatus according to the embodiment.

As shown in FIG. 2, the computer 11 includes, as functions to be performed thereby, a workpiece setting section 100, a robot position calculator 102, a mesh generator 104, a gripping condition calculator 106, a storage unit 110 for storing a plurality of gripping conditions 108, an initial value identifier 112, an allowable external force calculator 114, and a selector 116.

The workpiece setting section 100 sets a shape and an orientation of a workpiece 16. The robot position calculator 102 determines an attitude of the multijoint robot 17 based on the state of the workpiece 16 which is set by the workpiece setting section 100. The mesh generator 104 generates a predetermined mesh (or a group of gripping candidate points) for the entire surface of the workpiece 16 or a region thereof which can be gripped by the fingers 14. The gripping condition calculator 106 calculates a plurality of gripping conditions 108 which are conditions for gripping the workpiece 16 with the four fingers 14. The calculated gripping conditions 108 are stored in the storage unit 110. The plural gripping conditions 108 are determined depending on the mesh generated by the mesh generator 104. The initial value identifier 112 identifies from which point (one or more points) calculations are to be started based on the mesh generated by the mesh generator 104. The allowable external force calculator 114 calculates allowable external forces D with respect to the point identified by the initial value identifier 112 and points in the neighborhood of the identified point. The selector 116 selects a point where the greatest one of the allowable external forces D calculated by the allowable external force calculator 114 is obtained.

Some or all of the above functions to be performed by the computer 11 as shown in FIG. 2, are software-implemented. However, some of the functions, e.g., identifying an initial position P0, may be manually performed in certain circumstances. The functions shown in FIG. 2 do not necessarily need to be performed by a single computer.

A processing sequence to be described below is an offline processing sequence which is performed in a hypothetical three-dimensional space that is established by the computer 11. According to the offline processing sequence, the actual gripping apparatus 12 is not required, models can be set up freely, and there are no limitations on calculation times. For an easier understanding of the present invention, it is assumed in the following description that three of the four fingers 14 of the gripping apparatus 12 have their attitudes established in advance, and the remaining one of the four fingers 14, which has its attitude to be established, will be referred to unless otherwise noted.

The offline processing sequence will first be described below as a whole with reference to FIGS. 3 through 6. Subsequently, individual processing details will be described later.

Figure 3:
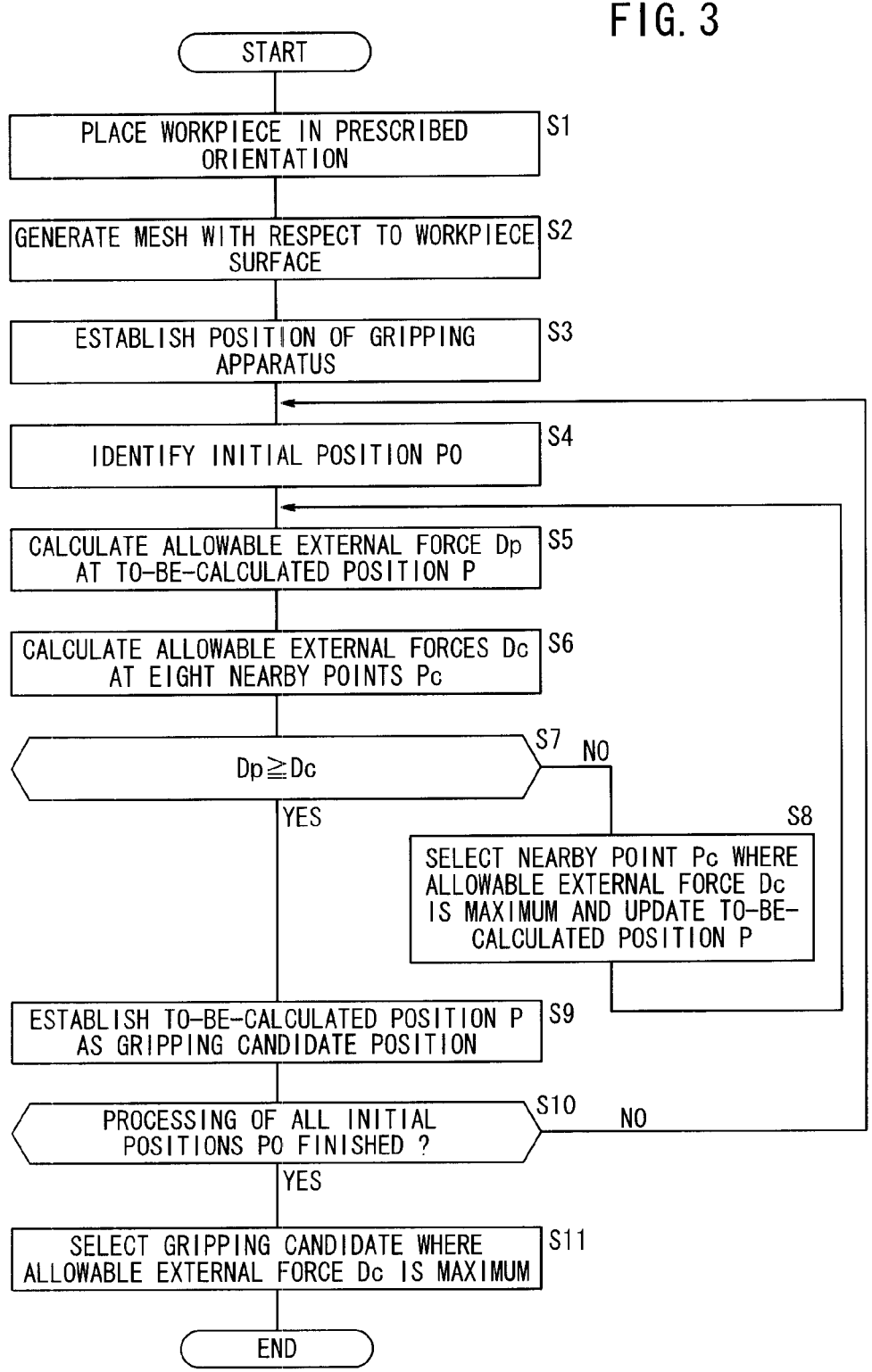
FIG. 3 is a flowchart of a gripping position calculating method according to the embodiment.

In step S1 shown in FIG. 3, a workpiece 16 in the form of a model (e.g., a polygonal model) is placed in a prescribed orientation. The orientation may be changed into a plurality of orientations, and the processing sequence to be described below may be performed with respect to those orientations to determine gripping data of the finger 14 with respect to the orientations. The workpiece 16 is not limited to the cylindrical shape shown in FIG. 1, but the processing sequence may be performed with respect to various workpiece shapes, sizes, and orientations that may be assumed to determine gripping data of the finger 14.

In step S2, at an initial stage, a mesh (see FIGS. 5 and 15) is generated as all candidates of positions where the distal end of the finger 14 can abut against the surface of the workpiece 16. The mesh is shown as being in the form of a grid. However, the mesh may comprise a polygonal mesh (e.g., a triangular mesh) which is used to represent the model of the workpiece 16, for example. The mesh is set up in a mesh size small enough to provide candidates of gripping positions, but large enough not to pose undue calculation loads. The step of generating a mesh may be carried out based on $U_i^{finger}$ to be described later.

Figure 4:
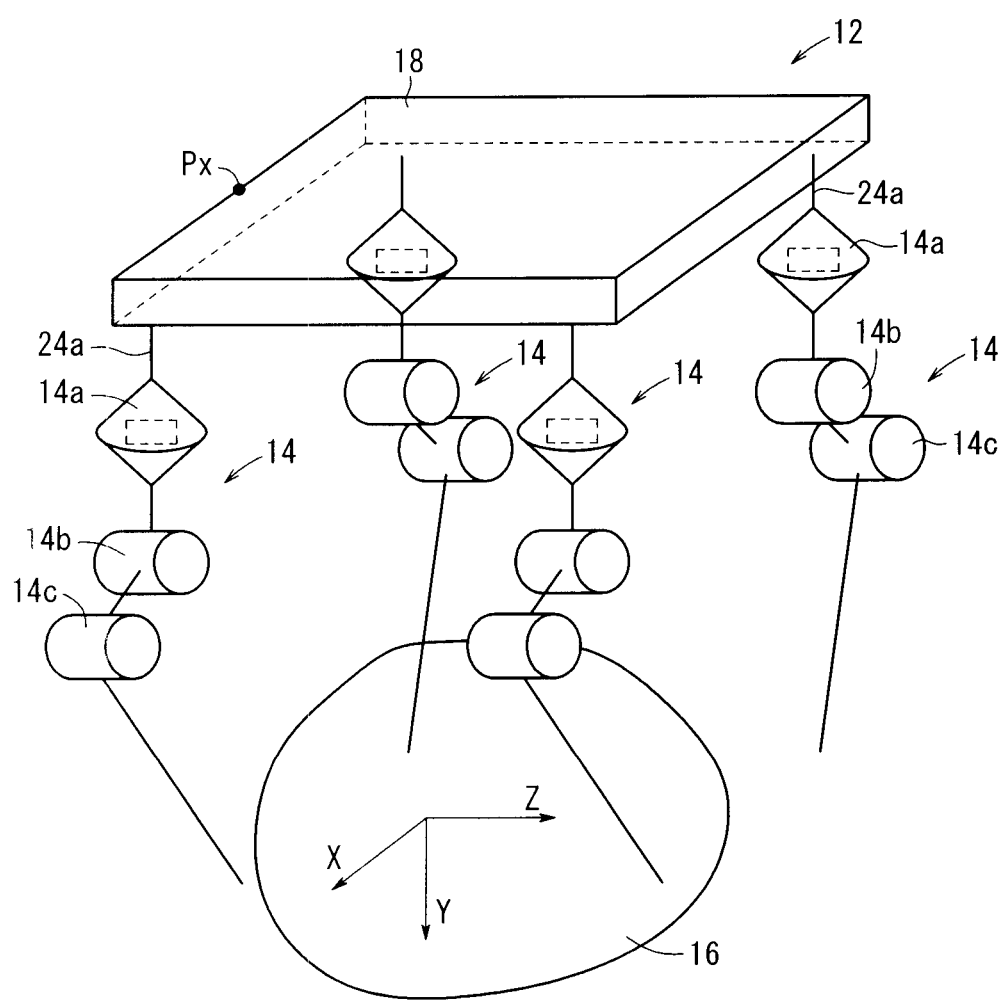
FIG. 4 is a view showing the manner in which four fingers grip a workpiece.

In step S3, as shown in FIG. 4, the position of the gripping apparatus 12 that is placed by the multijoint robot 17 is established. The position of the gripping apparatus 12 is established such that the finger 14 can grip the workpiece 16 at any one of possible attitudes thereof.

Figure 5:
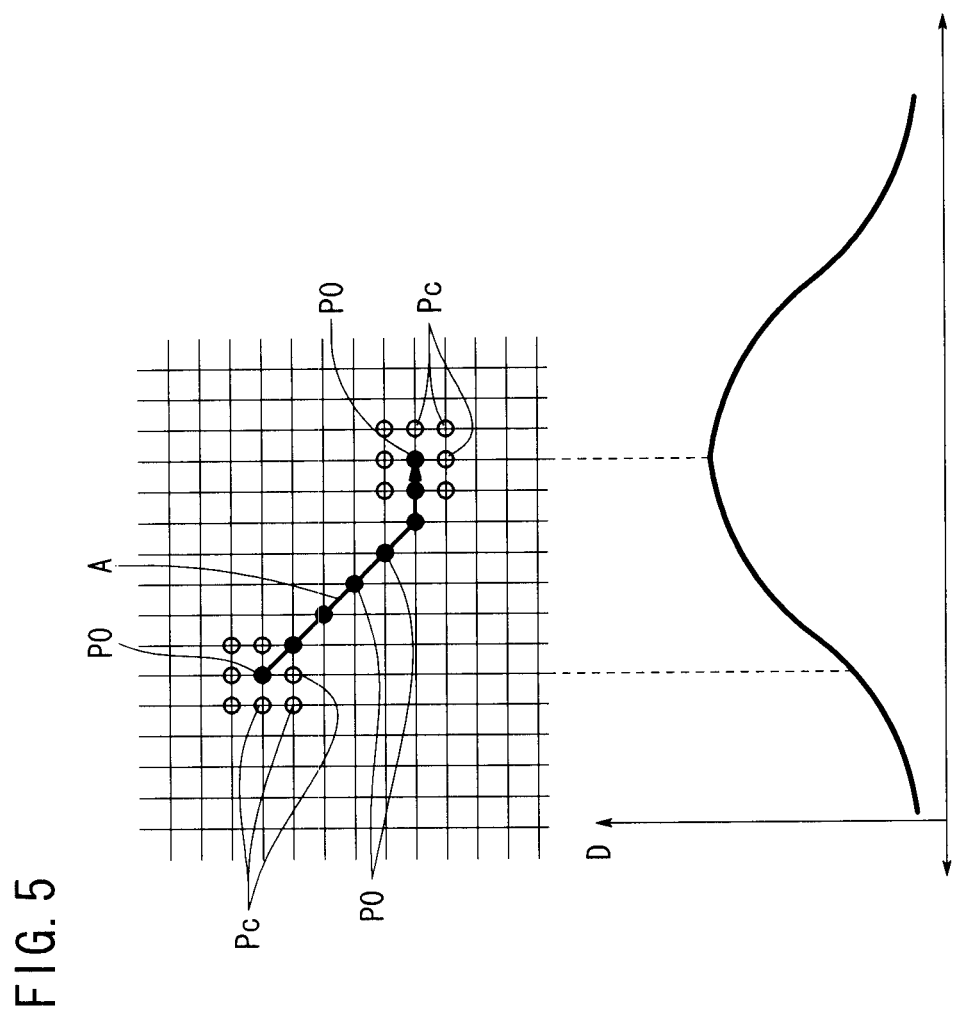
FIG. 5 is a diagram showing the manner in which an allowable external force is determined from one initial position.

In step S4, as shown in FIG. 5, an initial position (initial value) P0 where the distal end of the finger 14 grips the workpiece 16 with reference to the position determined in step S3 is identified based on the mesh generated in step S2, and the initial position P0 is regarded as a to-be-calculated position P. Specifically, a plurality of initial positions P0 are established in advance, and one of those initial positions P0 which remain to be unprocessed is selected.

It is assumed that gripping conditions based on the initial position P0 and nearby points Pc in the neighborhood thereof have been established as representing not only a gripping position but also a gripping force $f_m$ (see FIG. 12) as a vector quantity.

In step S5, an allowable external force D is calculated and stored which represents an index indicative of the magnitude of an external force that is capable of maintaining the gripping position if the finger 14 grips the workpiece 16 in the to-be-calculated position P at the time. The allowable external force D which corresponds to the to-be-calculated position P is denoted by Dp. Details of the allowable external force D will be described later.

In step S6, allowable external forces D exerted if the finger 14 grips the workpiece 16 at eight nearby points Pc around the to-be-calculated position P are calculated and stored. The allowable external forces D at the nearby points Pc are denoted by Dc. The nearby points Pc are shown as being eight points including those positioned upwardly, downwardly, leftwardly, and rightwardly of the to-be-calculated position P and those spaced obliquely from the to-be-calculated position P. However, the nearby points Pc may be four points positioned upwardly, downwardly, leftwardly, and rightwardly of the to-be-calculated position P.

In step S7, the allowable external force Dp and the allowable external forces Dc calculated in steps S5, S6 are compared with each other. If the allowable external force Dp is greater than all the allowable external forces Dc, then control goes to step S9. If any one of the allowable external forces Dc is greater than the allowable external force Dp, then control goes to step S8.

In step S8, one of the nearby points Pc where the allowable external force Dc is maximum is selected, and the to-be-calculated position P is updated into the selected nearby point Pc (see the arrow A in FIG. 5). Thereafter, control goes back to step S5 to continue calculations.

According to the above repetitive process, as shown in FIG. 5, convergent calculations are carried out based on the initial position P0 which is selected for the first time to select at least one of the points therearound where the allowable external force D is maximum. While in the repetitive process, the recalculation of allowable external forces D may be omitted for the updated to-be-calculated position P and the nearby points Pc with respect to which allowable external forces D have been calculated. If the allowable external force D is not converged after the repetitive process has been performed a given number of times, then the calculations may be terminated, and a predetermined corresponding process may be carried out.

In step S9, the to-be-calculated position P at the time is established as a gripping candidate position.

In step S10, it is confirmed whether all the established initial positions P0 have been processed or not. If there are any initial positions P0 which remain unprocessed, then control goes back to step S4. If all the established initial positions P0 have been processed, then control goes to step S10.

In step S11, one, where the allowable external force Dc is maximum, of a plurality of gripping candidates obtained based on the established initial positions P0, is selected and established as a final gripping position. The established final gripping position is stored in a predetermined storage unit, and supplied to the control apparatus 10.

In a case where the gripping apparatus 12 is in operation, the control apparatus 10 selects one of the workpieces 16, which is to be gripped, based on the information obtained from the optical means, and retrieves data of a gripping condition and a gripping position obtained based on a model close to the state of the selected workpiece 16. Based on the retrieved data, the control apparatus 10 actuates the finger 14 in the position control mode to grip the workpiece 16. Even if there is some positional error between the distal end of the finger 14 and the surface of the workpiece 16 at this time, the positional error will be eliminated if the control apparatus 10 subsequently switches to the force control mode, allowing the finger 14 to grip the workpiece 16 at an appropriate attitude with an appropriate force.

Figure 6:
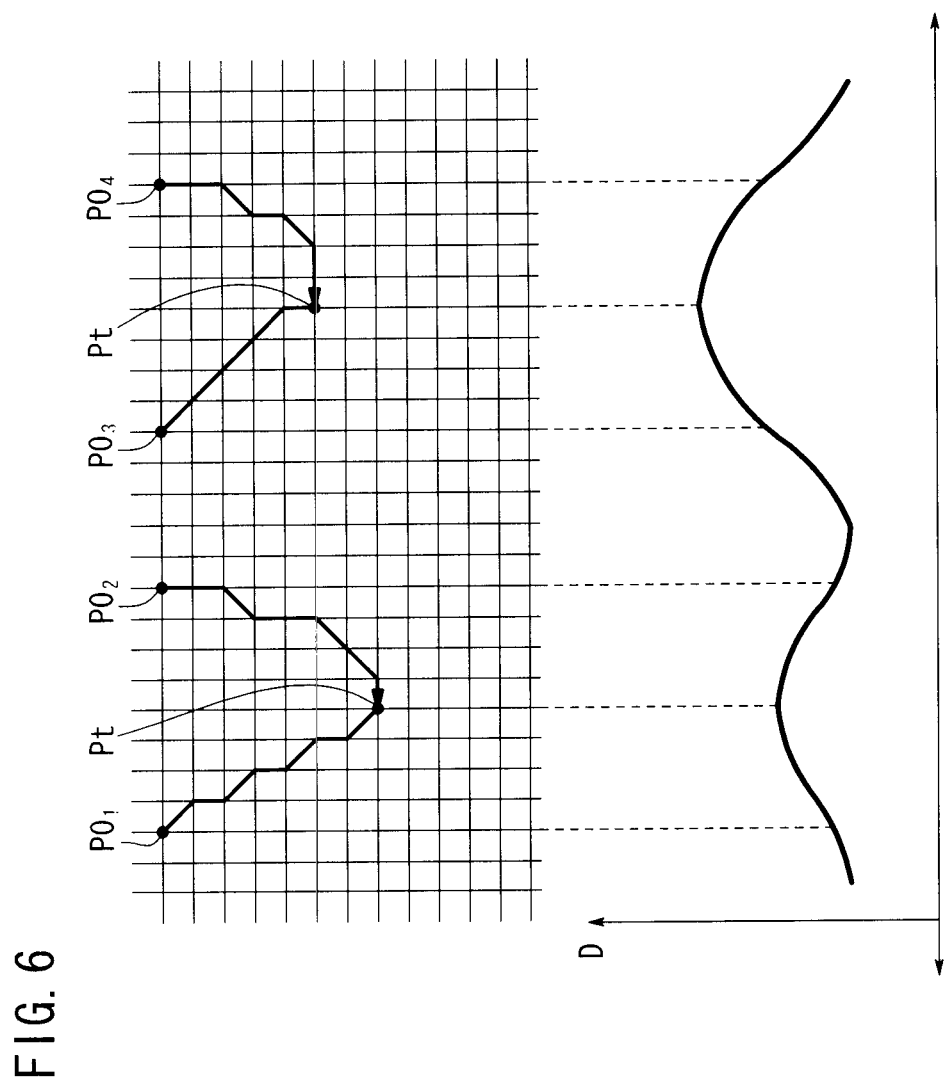
FIG. 6 is a diagram showing the manner in which an allowable external force is determined from a plurality of initial positions.

By thus carrying out convergent calculations based on the initial positions P0, as shown in FIG. 6, it is possible to select one, where the allowable external force Dc is maximum, of a plurality of gripping position candidates Pt which are obtained that correspond to the respective initial positions P0 (PO$_1$, PO$_2$, PO$_3$, PO$_4$ in FIG. 6).

Then, processing details of step S3 will be described below. For an easier understanding of step S3, it is assumed that the gripping apparatus 12 is translated in its motion with no attitude changes.

The gripping apparatus 12 is generalized such that it has N fingers 14 which are identified as fingers (0) through (n−1). The gripping position of the finger (i) on the surface of the workpiece 16 is denoted by Pi (i represents an integer ranging from 0 to n−1).

Figure 7:
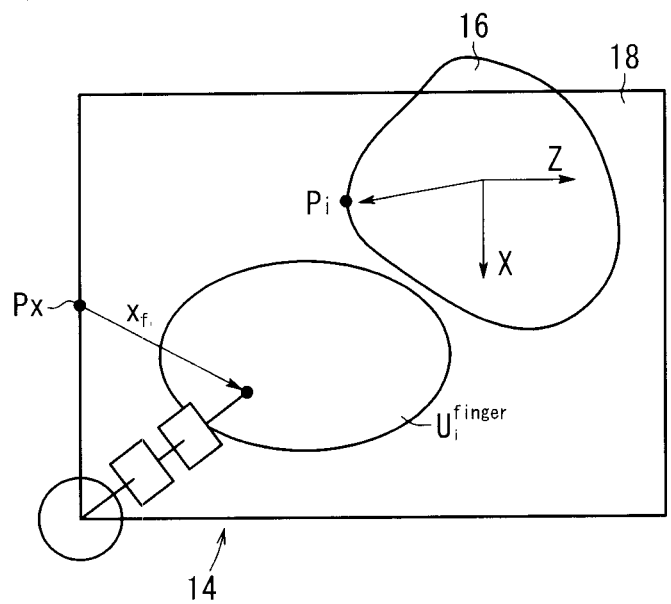
FIG. 7 is a diagram showing a set $U_i^{finger}$.
Figure 8:
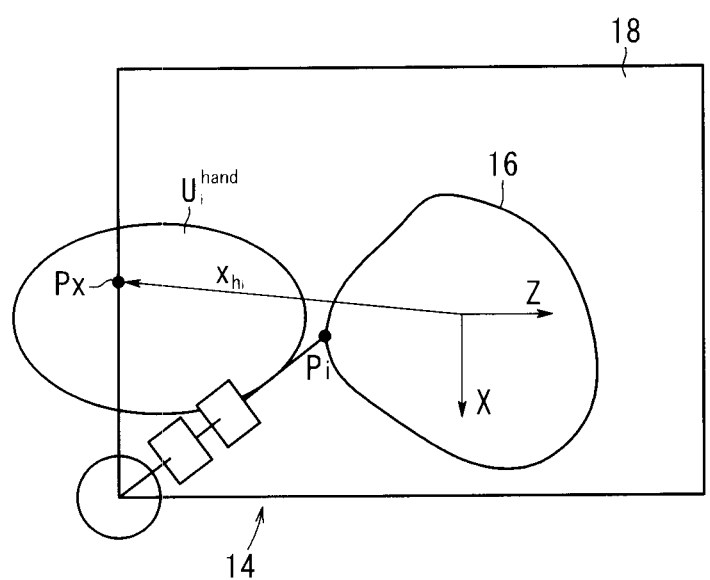
FIG. 8 is a diagram showing a set $U_i^{hand}$.

As shown in FIGS. 7 and 8, a set $U_i^{hand}$ of positions of the gripping apparatus 12 is determined, which are capable of having the distal end of the finger (i) reach the gripping position Pi. It is assumed that a set $U_i^{finger}$ represents a range that can be reached by the distal end of the finger (i) as viewed from a reference position Px of the gripping apparatus 12 (a given point on the base plate 18, e.g., an intermediate point between the finger (0) and the finger (1)). The set $U_i^{hand}$ is expressed as follows:

[Expression 1]

$$U_i^{hand} = \{x_{hi} | x_{hi} = p_i - x_{fi} \in U_i^{finger}\} \quad (1)$$

A set $U^{hand}$ of positions of the gripping apparatus 12 which are capable of having the distal ends of the fingers (0) through (n−1) reach respective gripping positions $P_0$ through $P_{n-1}$ is expressed as follows:

[Expression 2]

$$U^{hand} = U_0^{hand} \cap U_1^{hand} \cap \ldots \cap U_{n-1}^{hand} \quad (2)$$

A process of approximately expressing a workpiece 16 in determining such a set will be reviewed below.

If the set $U_i^{hand}$ representing the range that can be reached by the distal ends of all the fingers (i) is of a convex shape, then their intersection $U^{hand}$ is also of a convex shape. If the intersection $U^{hand}$ is also of a convex shape, then it may be approximated by a convex polyhedron $P^{hand}$ which is inscribed therein.

Figure 9:
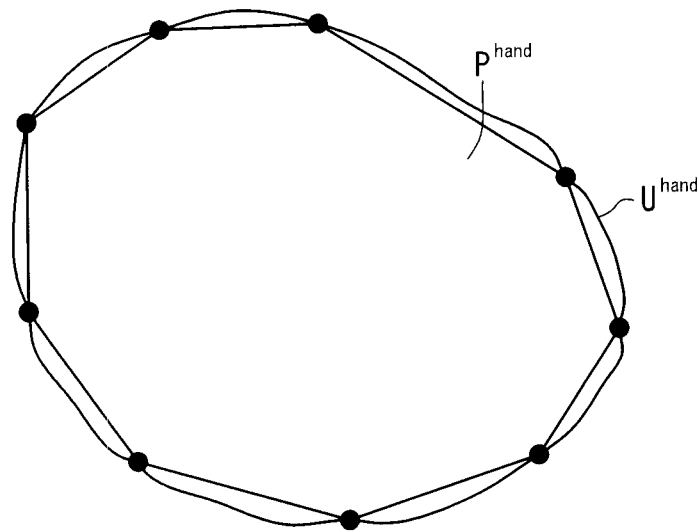
FIG. 9 is a diagram showing a convex polyhedron.

As shown in FIG. 9, the convex polyhedron $P^{hand}$ is represented $P_b$ which satisfies a linear matrix inequality expressed by the following expression (3):

[Expression 3]

$$P^{hand} = \{p_b | A_b p_b \leq b_b\} \quad (3)$$

where $A_b$, $b_b$ represent a matrix and a vector, respectively, determined by the vertexes of the convex polyhedron $P^{hand}$.

Figure 10:
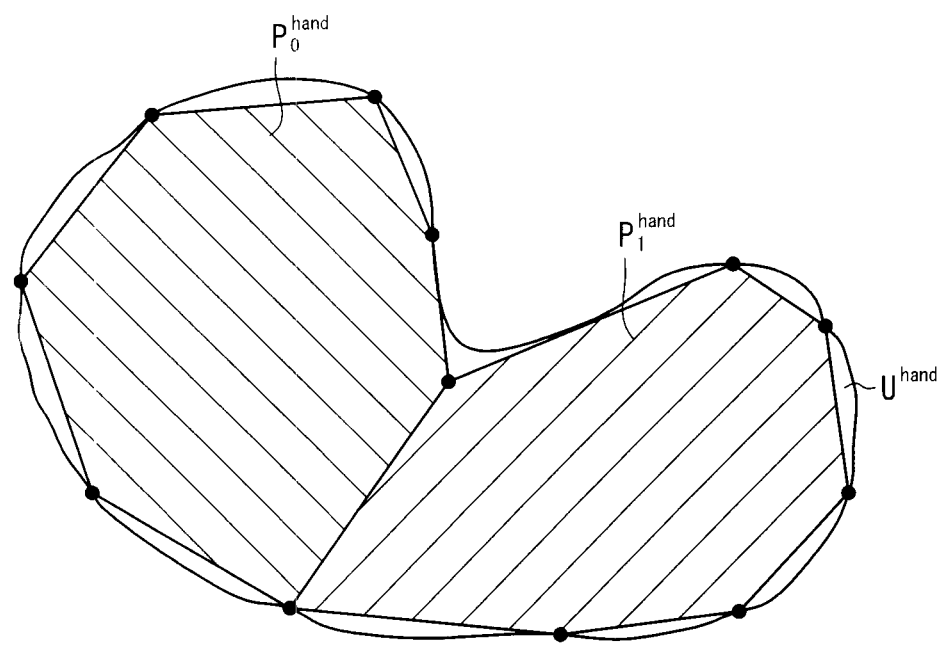
FIG. 10 is a diagram showing a nonconvex polyhedron.

If the product set $U^{hand}$ is also of a nonconvex shape, as shown in FIG. 10, it may be divided into a plurality of convex polyhedrons, approximated by the union thereof, and expressed by the equation (4) below. The equation (4) represents a union of n convex polyhedrons.

[Expression 4]

$$\begin{cases} P^{hand} = P_0^{hand} \cup P_1^{hand} \cup \ldots \cup P_{n-1}^{hand} \\ P_0^{hand} = \{p_{b0} | A_{b0} p_{b0} \leq b_{b0}\} \\ \vdots \\ P_{n-1}^{hand} = \{p_{b(n-1)} | A_{b(n-1)} p_{b(n-1)} \leq b_{b(n-1)}\} \end{cases} \quad (4)$$

Suboptimization of the position of the gripping apparatus 12 will be descried below.

For stably gripping a workpiece 16, it is necessary that forces and moments acting on the workpiece 16 by the gripping force need to be in equilibrium. The forces in equilibrium are expressed by the equation (5) and the moments in equilibrium are expressed by the equation (6) below.

[Expression 5]

$$f_0 + f_1 + \ldots + f_{n-1} = -mg \quad (5)$$

[Expression 6]

$$p_0 \times f_0 + p_1 \times f_1 \ldots + p_{n-1} \times f_{n-1} = -p_m \times mg \quad (6)$$

where $f_i$: vector of the gripping force of the finger (i),
m: the mass of the workpiece 16,
g: the vector of the gravitational acceleration,
$P_i$: the positional vector representative of the gripping position of the distal end of the finger (i) as viewed in a reference coordinate system, and
$P_m$: the positional vector representative of the center of gravity of the workpiece as viewed in the reference coordinate system.

Calculation of the allowable external force D in step S5 will be described below.

The allowable external force D represents an index indicative of the magnitude of an external force that can be allowed in a case where the workpiece 16 is stably gripped. Stated otherwise, the allowable external force D represents the level of robustness. The allowable external force D is described as an evaluation function $F^{evaluation}$, and is determined based on the position $P_b$ of the gripping apparatus 12 (the gripping position of the finger (i) is evaluation fixed) which maximizes the evaluation function $F^{evaluation}$ under the limitations posed by the expressions (5), (6), and (3) (or under the limitations posed by the expressions (5), (6), and (4)).

Figure 11:
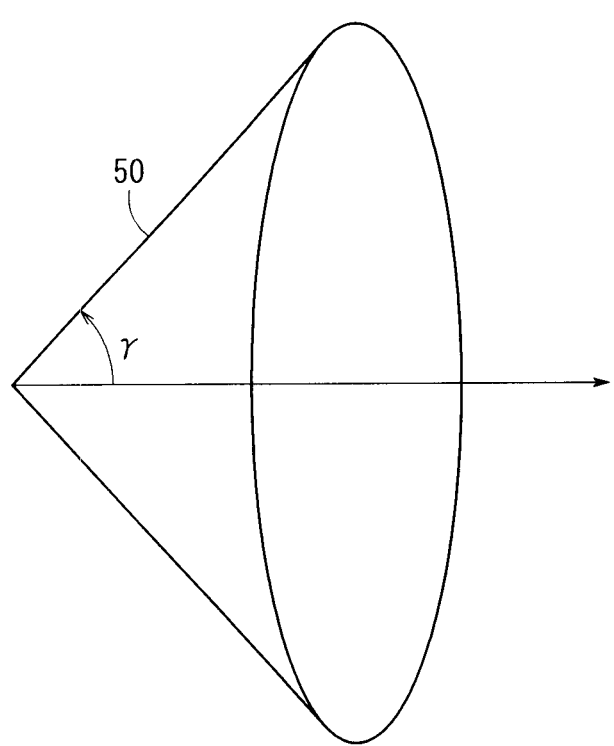
FIG. 11 is a diagram showing a friction cone.

As shown in FIG. 11, if a coefficient of friction between the finger (i) and the workpiece 16 is represented by μ, then a friction cone 50 with a centrally plotted normal vector $V_N$ at the gripping point on the workpiece 16 is established.

Figure 12:
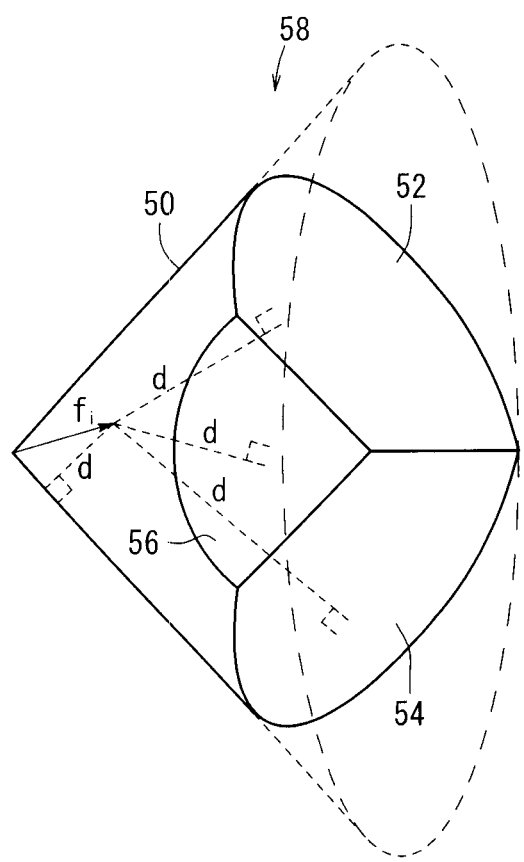
FIG. 12 is a diagram showing a three-dimensional body made up of a friction cone and a plurality of critical boundary sides.

The friction cone 50 has an opening angle $\gamma = \tan^{-1} \mu$. In order for the finger (i) not to slip, the vector of the gripping force $f_i$ needs to lie within the friction cone 50. Actually, there is an upper limit value that can be generated as the gripping force $f_i$, and the upper limit value is expressed as a plurality of critical boundary sides 52, 54, 56 as shown in FIG. 12. A three-dimensional body 58 partly in a conical shape is established as a whole.

Since the allowable external force is greater as the distance $d_i$ from the gripping force $f_i$ to each of the surfaces of the three-dimensional body 58 (i.e., the friction cone 50 and the critical boundary sides 52, 54, 56) is greater, a minimum value of the distance $d_i$ is described as an evaluation function $F^{evaluation}$ according the following expression (7):

[Expression 7]

$$F^{evaluation} = d_{min} = \min\{d_0, d_1, \ldots, d_{n-1}\} \quad (7)$$

For optimizing the gripping apparatus 12, Pb for maximizing the equation (7) may be determined under the limitations posed by the expressions (5), (6), and (3) (or under the limitations posed by the expressions (5), (6), and (4)).

To solve the optimization problem, an optimizing process such as a steepest descent method, for example, may be used to determine a suboptimal solution (local optimal solution).

Figure 13:
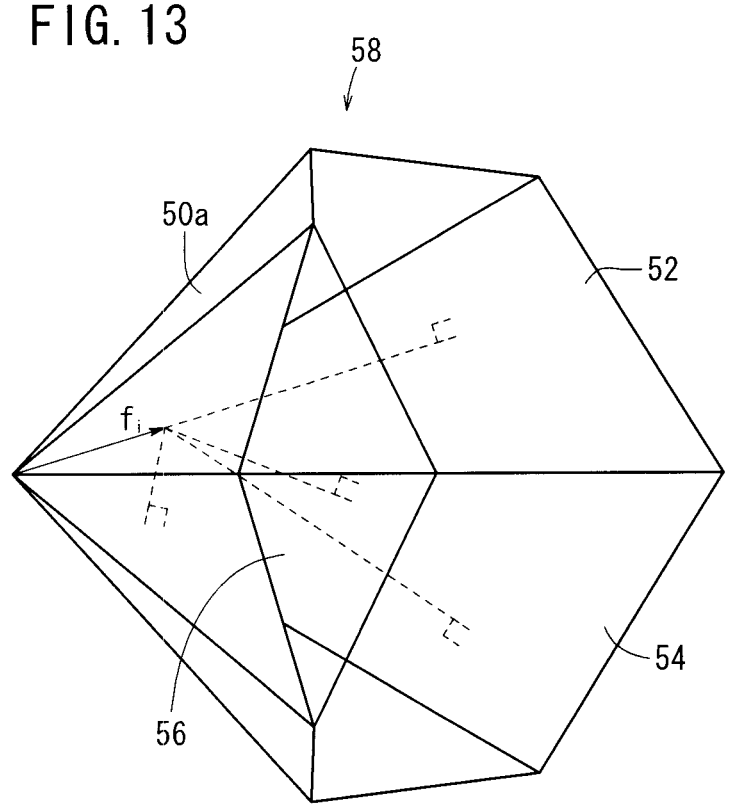
FIG. 13 is a diagram showing a three-dimensional body obtained by approximating a portion of the three-dimensional body shown in FIG. 12 with a polygonal pyramid.

In determining the distance $d_i$, a portion of the friction cone 50 may be approximated by a polygonal pyramid 50a (e.g., a regular octagonal pyramid) shown in FIG. 13.

A procedure for determining an allowable external force D from a minimum value of the distance $d_i$, i.e., the evaluation function $F^{evaluation}$, will be described below.

[Expression 8]

$$\begin{bmatrix} I_3 & \cdots & I_3 \\ [p_0 \times] & \cdots & [p_{n-1} \times] \end{bmatrix} \begin{bmatrix} f_0 \\ \vdots \\ f_{n-1} \end{bmatrix} = \begin{bmatrix} -I_3 \\ -[p_m \times] \end{bmatrix} f \quad (8)$$

where the left side represents a combined force acting on the workpiece 16 due to the gripping force, the left matrix on the left side is represented by A, the right matrix on the left side by f, the left matrix on the right side by B, and $f_m$ represents an external force acting on the workpiece 16.

The, the following expression (9) is calculated:
[Expression 9]

$$f_m = B^+ A f \quad (9)$$

where $B^+A$ represents a transform matrix for relating the external force and the gripping force to each other, and $B^+$ a pseudo-inverse matrix of B.

Then, a singular value decomposition according to the following expression (10) is performed:

[Expression 10]

$$B^+ A = U \left[ \sum 0_{3 \times 3(n-1)} \right] V^T \quad (10)$$

$$\sum = \begin{bmatrix} \sigma_1 & & 0 \\ & \sigma_2 & \\ 0 & & \sigma_3 \end{bmatrix} \quad \begin{array}{l} \text{matrix of diagonally} \\ \text{arranged singular} \\ \text{values (3} \times \text{3 matrix)} \end{array}$$

$\sigma_i$: degree of influence of gripping force $f$ on external force $f_m$ $$U = [u_1^T \; u_2^T \; u_3^T]^T$$

Figure 14:
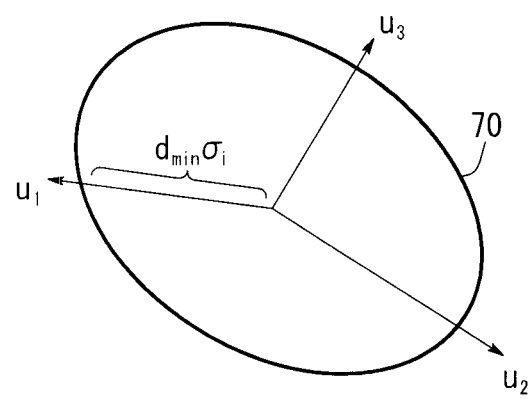
FIG. 14 is a diagram showing an allowable external force elliptical body.

Thereafter, the allowable external force D can be determined as D=min $(d_{min}\sigma_i)$ based on an allowable external force elliptical body 70 shown in FIG. 14.

In the expression (10), $u_i$ represents the three-dimensional vector of a major axis of the allowable external force elliptical body 70. In the equation for determining the allowable external force D, $d_{min}\sigma_i$ represents the magnitude of the allowable external force on each axis, and min( ) a function for selecting a minimum value.

Figure 15:
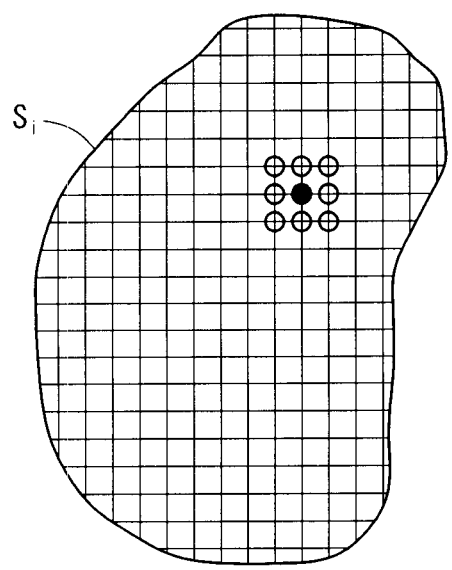
FIG. 15 is a diagram showing a grippable region on a workpiece surface with a mesh plotted thereon.

In step S2 of generating a mesh, the range that can be reached by the distal end of the finger (i) while the position of the gripping apparatus 12 is fixed to the position determined by the above means may is represented by $U_i^{finger}$, and the region that can be gripped on the surface of the workpiece 16 by O, $S_i$ is set to $S_i = U_i^{finger} \cap O$, and the points on $S_i$ is approximated by a sufficient set of points to generate a mesh as shown in FIG. 15. The relationship between adjacent points of the point group is recorded or defined by a predetermined expression.

With the computer 11 as the gripping position calculating apparatus and the gripping position calculating method according to the present embodiment, the fingers 14 can grip a workpiece 16 more stably by determining a gripping position based on an allowable external force which represents an index indicative of the magnitude of an external force that is allowed.

According to a judgment based on the friction cone 50 and the critical boundary sides 52, 54, 56 of the gripping force that can be generated by the distal end of the finger 14, an appropriate allowable external force D can be determined for gripping the workpiece 16 much more stably.

The number of fingers 14 of the gripping apparatus 12 that is controlled by the control apparatus 10 is not limited to four, but may be two or three. A single movable finger 14 may be used, and companion members for gripping a workpiece 16 may be fixed members.

The number of joints of each finger 14 is not limited three, but may be two or four or more.

The gripping position calculating apparatus and the gripping position calculating method according to the present invention are not limited to the above embodiment, and may adopt various arrangements without departing from the scope of the invention.

The invention claimed is:

1. A gripping position calculating apparatus for identifying a position where a multijoint manipulator movable by a moving member grips a workpiece according to an offline processing sequence of a computer, comprising:
   an allowable external force calculator for calculating an allowable external force as an index indicative of magnitude of an external force which is allowed, with respect to a given gripping condition; and
   a selector for selecting a gripping condition for a greatest calculated allowable external force in a case where the allowable external force calculator determines allowable external forces with respect to a plurality of gripping conditions.

2. The gripping position calculating apparatus according to claim 1, wherein the allowable external force is determined with respect to a smallest one of a plurality of distances from a cone boundary side of a frictional force with respect to a position where a distal end of the manipulator grips the workpiece under the gripping condition, and from critical boundary sides of a gripping force which can be generated by the distal end of the manipulator.

3. A gripping position calculating method for identifying a position where a multijoint manipulator movable by a moving member grips a workpiece according to an offline processing sequence of a computer, the method comprising:
   a first step of determining a position of the moving member where the manipulator can grip the workpiece at either one of attitudes;
   a second step of identifying an initial value of a gripping position where a distal end of the manipulator grips the workpiece with respect to the position of the moving member determined in the first step, and regarding the identified initial value as a to-be-calculated position;
   a third step of calculating and storing an allowable external force as an index indicative of magnitude of an external force which is allowed if the distal end of the manipulator grips the workpiece at the to-be-calculated position at the time;
   a fourth step of calculating and storing allowable external forces if the distal end of the manipulator grips the workpiece at a plurality of nearby positions around the to-be-calculated position; and
   after the third step and the fourth step, a fifth step of identifying the to-be-calculated position as a gripping candidate position if the allowable external force at the to-be-calculated position is equal to or greater than the allowable external forces at all the nearby positions around the to-be-calculated position, and updating one of the nearby positions where the allowable external force is maximum into the to-be-calculated position if the allowable external force at the to-be-calculated position is smaller than the allowable external force at any one of the nearby positions around the to-be-calculated position, and making a judgment to return to the fourth step.

4. The gripping position calculating method according to claim 3, wherein the allowable external force is determined with respect to a smallest one of a plurality of distances from a cone boundary side of a frictional force with respect to a position where a distal end of the manipulator grips the workpiece under the gripping condition and from critical boundary sides of a gripping force which can be generated by the distal end of the manipulator.

5. The gripping position calculating method according to claim 3, wherein a plurality of initial values are established in the second step, and the third through fifth steps are carried out based on each of the initial values, and one of a plurality of gripping candidate positions where the allowable external force is maximum is further selected.

6. The gripping position calculating method according to claim 4, wherein a plurality of initial values are established in the second step, and the third through fifth steps are carried out based on each of the initial values, and one of a plurality of gripping candidate positions where the allowable external force is maximum is further selected.

* * * * *

UNITED STATES PATENT AND TRADEMARK OFFICE
CERTIFICATE OF CORRECTION

PATENT NO. : 8,452,452 B2
APPLICATION NO. : 13/148183
DATED : May 28, 2013
INVENTOR(S) : Kondo et al.

It is certified that error appears in the above-identified patent and that said Letters Patent is hereby corrected as shown below:

Delete the title page and substitute therefore with the attached title page consisting of corrected illustrative figure 3.

Signed and Sealed this
Eighth Day of October, 2013

Teresa Stanek Rea
*Deputy Director of the United States Patent and Trademark Office*

(12) United States Patent
Kondo et al.

(10) Patent No.: US 8,452,452 B2
(45) Date of Patent: May 28, 2013

(54) GRIP POSITION CALCULATOR AND METHOD OF CALCULATING GRIP POSITION

(75) Inventors: Toshiyuki Kondo, Tochigi-ken (JP); Shinji Sawada, Tochigi-ken (JP); Nobuhiro Nanba, Utsunomiya (JP); Yoshikazu Hayakawa, Nagoya (JP); Kenji Fujimoto, Nagoya (JP); Akira Nakashima, Nagoya (JP); Takashi Uno, Obu (JP)

(73) Assignees: Honda Motor Co., Ltd., Tokyo (JP); National University Corporation, Nagoya-Shi (JP)

( * ) Notice: Subject to any disclaimer, the term of this patent is extended or adjusted under 35 U.S.C. 154(b) by 144 days.

(21) Appl. No.: 13/148,183

(22) PCT Filed: Jan. 28, 2010

(86) PCT No.: PCT/JP2010/051079
§ 371 (c)(1),
(2), (4) Date: Aug. 5, 2011

(87) PCT Pub. No.: WO2010/090117
PCT Pub. Date: Aug. 12, 2010

(65) Prior Publication Data
US 2011/0288683 A1 Nov. 24, 2011

(30) Foreign Application Priority Data

Feb. 9, 2009 (JP) ................. 2009-027596

(51) Int. Cl.
*G05B 15/00* (2006.01)
*G06F 19/00* (2006.01)
(52) U.S. Cl.
USPC ......... 700/260; 700/245; 700/248; 700/246; 700/250
(58) Field of Classification Search
None
See application file for complete search history.

(56) References Cited

U.S. PATENT DOCUMENTS

2008/0023974 A1 * 1/2008 Park et al. .............. 294/106
2008/0114491 A1 * 5/2008 Takahashi ............... 700/245

FOREIGN PATENT DOCUMENTS

JP 2006-026875 2/2006

* cited by examiner

*Primary Examiner* — Ian Jen
(74) *Attorney, Agent, or Firm* — Rankin, Hill & Clark LLP

(57) ABSTRACT

The grip position calculator determines a grip position where the fingers can grip a workpiece in any orientation of the workpiece. The calculator then determines an initial position where the finger tips can grip the workpiece and set the initial position as a point of calculation. Then an allowable gripping force is calculated which is an index that indicates an allowable force to be applied to the workpiece at point. Then other allowable forces are calculated for a plurality of points near the point of calculation. Then the point of calculation is selected as a possible gripping position if the allowable force a point is greater than any of the allowable forces. Otherwise, one of the points is selected for another point of calculation where the greatest allowable force (De) has been calculated and return to calculating an allowable gripping force.

6 Claims, 15 Drawing Sheets

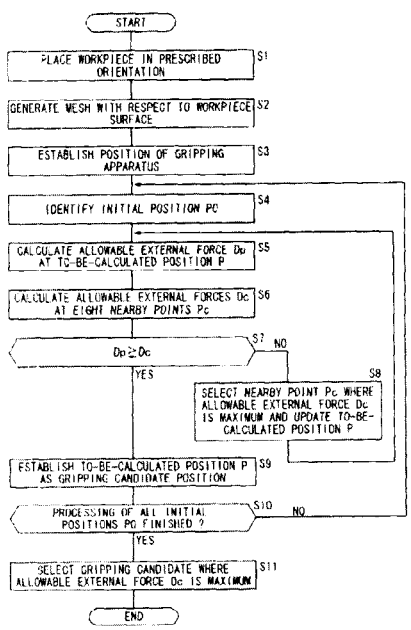

UNITED STATES PATENT AND TRADEMARK OFFICE
CERTIFICATE OF CORRECTION

| | |
|---|---|
| PATENT NO. | : 8,452,452 B2 |
| APPLICATION NO. | : 13/148183 |
| DATED | : May 28, 2013 |
| INVENTOR(S) | : Kondo et al. |

It is certified that error appears in the above-identified patent and that said Letters Patent is hereby corrected as shown below:

Title Page, Item 73: delete "National University Corporation" and insert -- National University Corporation Nagoya University, Nagoya-Shi (JP) --.

Signed and Sealed this
Seventh Day of January, 2014

Margaret A. Focarino
*Commissioner for Patents of the United States Patent and Trademark Office*